(12) United States Patent
Lopes et al.

(10) Patent No.: US 11,066,258 B2
(45) Date of Patent: Jul. 20, 2021

(54) CONTROL SYSTEM AND CONTROL METHOD FOR ROTARY CAR DUMPERS

(71) Applicant: VALE S.A., Rio de Janeiro (BR)

(72) Inventors: Bruno Eduardo Lopes, Vitoria (BR); Celson José De Resende Neto, São Luis (BR); Waldinir Lima Castro Silva, São José de Ribamar (BR)

(73) Assignee: VALE S.A., Rio de Janeiro (BR)

( * ) Notice: Subject to any disclaimer, the term of this patent is extended or adjusted under 35 U.S.C. 154(b) by 175 days.

(21) Appl. No.: 16/142,993

(22) Filed: Sep. 26, 2018

(65) Prior Publication Data
US 2019/0092586 A1    Mar. 28, 2019

(30) Foreign Application Priority Data
Sep. 26, 2017  (BR) .................... 102017020555-0

(51) Int. Cl.
*B65G 67/50*    (2006.01)
*B65G 53/66*    (2006.01)

(52) U.S. Cl.
CPC ............. *B65G 67/50* (2013.01); *B65G 53/66* (2013.01)

(58) Field of Classification Search
CPC ........ B65G 67/48; B65G 67/50; B65G 67/56; B65G 2814/0362; B61J 3/06
USPC .................................................. 414/359–361
See application file for complete search history.

(56) References Cited

U.S. PATENT DOCUMENTS

| | | | | |
|---|---|---|---|---|
| 5,174,212 A | * | 12/1992 | Judy ........................ | B61J 3/06 104/162 |
| 7,411,136 B2 | * | 8/2008 | Walker ................... | G01G 13/24 141/83 |
| 9,440,804 B2 | * | 9/2016 | Lopes .................. | B65G 65/005 |

FOREIGN PATENT DOCUMENTS

WO    WO 2013/181728 A1    12/2013

* cited by examiner

*Primary Examiner* — Mark C Hageman
(74) *Attorney, Agent, or Firm* — Arent Fox LLP

(57) ABSTRACT

This invention relates to a control system and method for rotary car dumpers comprising a positioning car, silos and feeders. Such control system comprises three integrated and communicating controls in closed grid, that is, the positioning car control, the silos level control and the feeder flow control. In this way, with the data of these controls, the rotary car dumpers control system is configured to maintain the level of silo at maximum, performing changes in the cycle time by controlling the positioning car to maintain the level of silos and thus achieve maximum productivity of the equipment.

19 Claims, 4 Drawing Sheets

CONTROL SYSTEM AND CONTROL METHOD FOR ROTARY CAR DUMPERS

CROSS-REFERENCE TO RELATED APPLICATION

This application claims priority to Brazilian Patent Application No. BR 102017020555-0, filed Sep. 26, 2017. The disclosure of the priority application is incorporated in its entirety herein by reference.

FIELD OF THE INVENTION

The present invention relates to an operating system and a method for performing the monitoring and control of rotary car dumpers in mining sector.

BACKGROUND OF THE INVENTION

With the increasing demand for iron ore and greater competitiveness in the world market, seeking a better efficiency of port activities is a basic condition to ensure the economic sustainability of a company.

The iron ore business chain is typically and essentially composed of a triad: mine, railroad, and port. All the assets that make up this business chain are designed in order to allow handling a volume of material expected for the system. If an asset cannot work within the expected productivity value, it becomes an obstacle (bottleneck) for the whole system.

The rotary car dumper is an important asset and comprise the port portion of the triad of iron ore business chain. The process performed by the rotary car dumper aims to receive the railroad cars from a mine and discharge the ore in the ore stockyard or directly load it on the ship. Optimizing the time spent on this operation is necessary in order to maintain a high productivity in the system.

Basically, the rotary car dumper consists of a positioning car having an arm attached thereto, the arm being responsible for dragging the railroad cars loaded with ore by moving the car, positioning one or two railroad cars in one structure named rotary drum.

With the railroad cars properly positioned in the rotary drum, devices are actuated to lock them in position, this being accomplished by means of scissors, locking arms, and clamps.

The scissors and/or locking arms prevent the railroad cars that are outside the rotary drum from moving along with the railroad cars being turned. The clamps lock the railroad cars inside the drum, allowing them to rotate without losing contact with the rotary car dumper.

The railroad cars are then turned 180° and the material contained therein is discharged into bins positioned at the bottom of the rotary car dumper. After the complete discharge of the material contained in the railroad cars that have been turned over, the cycle repeats until all railroad cars are discharged.

During turning, the ore is discharged into bins which are associated with feeders. These feeders direct the ore to conveyor belts that lead it to the stockyard or directly to the ship.

The discharge cycle consists of positioning, operating, and returning the railroad car from turning. The interval between one turn and the next one is named the cycle time of the rotary car dumper.

The rotary car dumpers cycle can be segmented into the following micromovements: advance the pushing car; close scissors/lower lock; lower clamp; perform the 180° turn; return from turn; lift clamp; raise main arm; return pusher; lower main arm; and open scissors/lift lock.

It is worth emphasizing that the total time of cycle is not the result of the total sum of each micromovement, since several micromovement activities are carried out in parallel.

In addition, the only controllable micromovement in the rotary car dumper cycle is advancing the positioner, which is carried out by means of the positioning car.

In order to obtain the maximum productivity of the rotary car dumpers, that is, a large flow of material being discharged, the rotary car dumper must have three (3) controls implemented and integrated in a closed grid, as follows: flow control in the feeder outlets; bin level control; and cycle time control.

In the state of the art, flow control in the feeder outlets and bin level control are performed in a closed grid (as described in the patent document WO2013181728). However, cycle time control in the rotary car dumpers is still performed in open grid and is not integrated with the other controls.

Controlling the cycle time in open grid of the state of the art can be implemented in two ways, these having constant cycle time throughout the discharging of the railroad cars or reduced cycle time as the railroad cars are discharged.

In the first control, that is, with constant cycle time, the cycle time for each turn is constant and its value is equal to the design value, the design value being calculated to maintain the flow at a nominal rate of discharge for a certain type of material (usually the material most discharged by the port). In case of failure or low performance of any micromovement of the cycle, the loss of productivity is directly proportional to the time lost during the execution of this micromovement.

In the second control, that is, with reduced cycle time for each discharged railroad car, the total weight of the railroad cars is reduced. Therefore it is possible to reduce the time spent by the positioning car to position the railroad cars in the rotary drum by adjusting the speed/acceleration of the positioning car which, as a result, reduces the total cycle time.

One of the major problems of controlling the state of the art is the fact that the operating adjustments of the positioning car are performed on a worst case basis, that is, heavy railroad cars working at the nominal rate. The result is a high loss of productivity when discharging the initial railroad cars, since for lighter railroad cars it would be possible to reduce the cycle time when necessary. In many cases it is also identified unnecessary forces of the pushing car when discharging the final railroad cars, since the bin is already full and yet the rotary car dumper works within a time period below the necessary interval.

Another problem of the state of the art, which occurs in a frequent basis, especially in rainy periods, is the rotary car dumper having to discharge railroad cars heavier than the limits set by its control, resulting in several position losses in the positioning car.

Thus, the cycle time control of the state of the art in open grid is inefficient to achieve maximum productivity of the rotary car dumper, thus generating economic losses since productivity is not in its maximum conditions and, in addition, possible damages to this equipment.

The state of the art comprises some patent documents, which disclose controls for positioning car of rotary car dumpers, one of which is U.S. Pat. No. 5,174,212.

The American document discloses a control system for positioning cars in rotary car dumpers. This system performs measurements on the pushing car to determine the acceleration and deceleration of that equipment and, thereby, decrease the cycles' time of the rotary car dumper.

The system measures the following data of the positioning car: electric current of its electric motor; position of the car in relation to the rail; and its speed. Based on this data, the control is able to calculate the mass of the set being loaded or unloaded.

Using the calculated mass of the set, the system makes adjustments in the acceleration and deceleration of the positioning carriage in order to decrease the cycle time of the rotary car dumper as it becomes heavier or lighter.

These adjustments are made automatically by the control by means of a PLC (programmable logic controller) and a computer that makes up the system, thus increasing the productivity of the machine.

However, the state of the art document U.S. Pat. No. 5,174,212 calculates the parameters of deceleration of the pushing car according to the mass calculated during the acceleration process, not taking into account that the acceleration and deceleration processes undergo different influences by situations that occur in a frequent basis, such as railroad car in uphill or downhill conditions, railroad car stopped (with brakes applied), and damaged bearing of wheelsets.

In addition, the American document U.S. Pat. No. 5,174,212 does not consider the level of bins when calculating the parameters of acceleration and deceleration of the pushing car, causing that element to be empty in some moments or even overflow, thus generating loss of productivity during the operation of the rotary car dumper.

Thus, the state of the art does not include a control system for rotary car dumpers which takes into account all the elements and variables involved in the rotary car dumper cycle, allowing to achieve maximum productivity of that equipment.

Therefore, the state of the art does not comprise a control system that integrates and connects the three main controls of a rotary car dumper in closed grid.

Purposes of the Invention

The present invention aims to provide a control system for rotary car dumpers in a simple and efficient manner and without the need for great computational forces.

The present invention also aims at a control system for rotary car dumpers which integrates and communicates the three main controls of the rotary car dumper in closed grid.

The present invention further aims at a control method of rotary car dumper to establish the shortest cycle time and achieve the maximum productivity of the rotary car dumper.

SUMMARY OF THE INVENTION

The present invention discloses a control system for rotary car dumpers comprising at least one positioning car, a bin, and a feeder, said control system being configured to calculate an ideal cycle time for discharging material from the railroad cars.

The control system comprises at least three integrated and communicating controls in closed grid, as follows: (i) a positioning car control; (ii) a bin level control, configured to measure the level of material within the bins; and (iii) a feeder flow control configured to measure and change the amount of material transported by the feeders.

The integration of these three controls in closed grid is configured to maintain the bin level at its maximum limit and the flow of the feeders at their nominal rate.

The positioning car control is configured to measure the current, speed, torque, and position of the positioning car by changing the time of the material discharge cycle based on the bin level, thus increasing the cycle time when the bin level is high and decreasing the cycle time when the silo level is low, this level being measured by a sensor comprising the bin level control.

In order to collect the data, the positioning car control comprises an encoder to measure the position of the positioning car and an inverter/converter to measure the current and torque of the positioning car by integrating said data into a PLC of the control system of rotary car dumpers.

The present invention also discloses a control method of rotary car dumpers comprising the following steps: i. verify the bin level of the feeder by means of bin level control; ii. if the bin level is high, increase the cycle time by means of the positioning car control; if the bin level is ideal, maintain the level with the cycle time in an ideal value, calculated by means of the flow set point desired by the operator; if the bin level is low, continue to step iii; iii. measure the current, torque, position, speed, and acceleration of the positioning car by means of positioning car control and verify if the cycle time can be decreased by increasing the forces of the positioning car; if the cycle time can be reduced, based on the positioning car control, decrease the cycle time; if the cycle time cannot be reduced, based on the positioning car control, decrease the output material flow of the feeders by means of the feeder flow control.

The verifications and alterations of step iii are performed by means of analysis and control of the acceleration and deceleration parameters, these being configured to control and manipulate the variables of the positioning car: acceleration ramp; cruising speed; deceleration points; and deceleration ramp.

The analysis and control of the acceleration parameters allow to increase or decrease the value of the acceleration ramp, while the analysis and control of the deceleration parameters allow to increase or decrease the values of the deceleration points and the deceleration ramp.

These changes made by the analysis and control of the acceleration and deceleration parameters modify the acceleration times and the deceleration times and points, respectively, thereby altering the cycle time so that it reaches an ideal cycle time.

BRIEF DESCRIPTION OF THE DRAWINGS

The present invention is further described based on the respective figures.

DETAILED DESCRIPTION OF THE INVENTION

Figure 2:
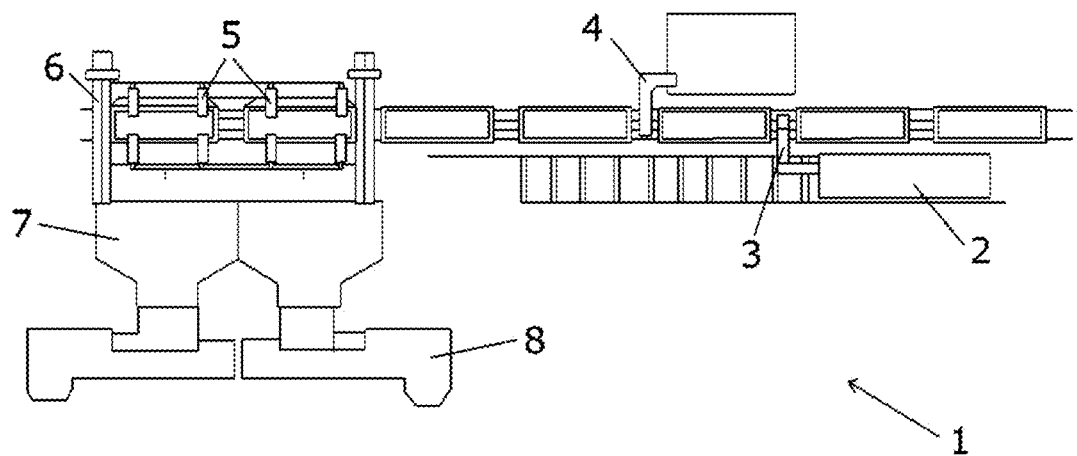
FIG. 2 depicts a schematic drawing of a rotary car dumper.

The present invention describes a system and a control method for rotary car dumpers 1 (see FIG. 2), which controls the cycle time in closed grid using information on the level of bin 7 and information on the positioning car 2 as current, torque, speed, and position.

The ideal cycle time is calculated using the level of bin 7 so that when bin 7 is full the cycle time keeps only bin 7 full and when it is low the cycle time is reduced to the maximum limit depending on the forces measured on the positioning car 2.

The control system always calculates the ideal cycle time based on the information of the communicating controls of the rotary car dumper 1, allowing it to be increased or reduced according to the level of bins 7 and the request state of the positioning car 2.

Thus, the control system requires additional forces of the positioning car 2 only when really necessary. Information on current, torque, position, and speed of the positioning car 2 in the current cycle are used as input parameters of the model for calculating the acceleration, positions, and speed of the positioning car 2 for the next cycle.

Figure 3:
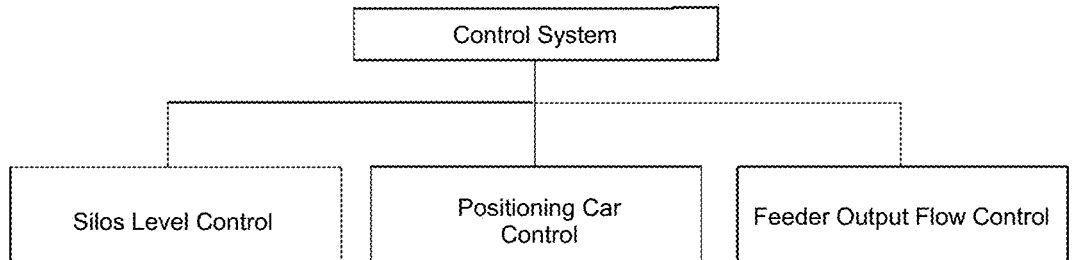
FIG. 3 shows a flowchart of the controls necessary for operation of the control system for rotary car dumpers.

In order to develop the present control system for rotary car dumpers 1, the following controls must be installed and functioning correctly, as in FIG. 3.

Positioning Car Control

Figure 1:
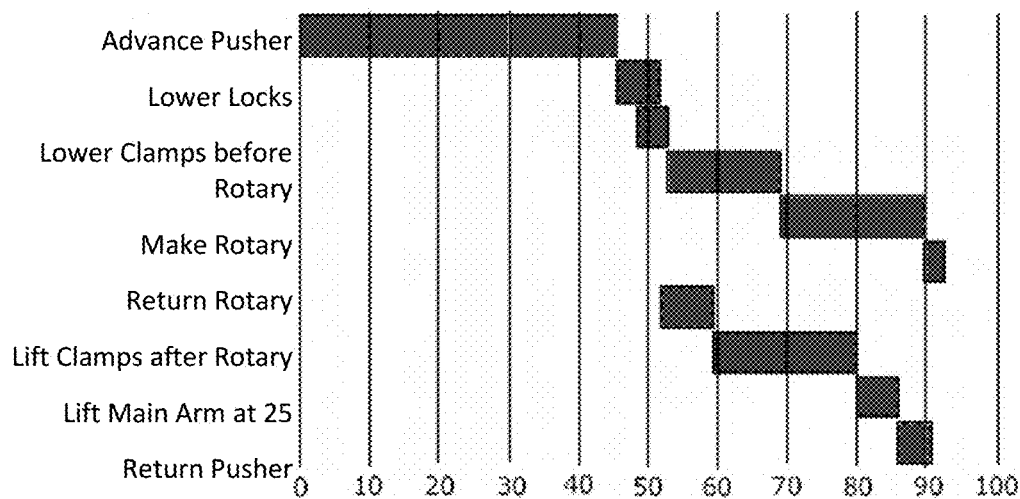
FIG. 1 is a graph which exemplifies the micromovements of the rotary car dumper cycle as a function of time.

As previously stated, the total time of cycle is not the result of the total sum of each micromovement, since several micromovement activities are carried out in parallel, as shown in the graph of FIG. 1. The only controllable micromovement in the rotary car dumper cycle is advancing the positioner, which is carried out by means of the positioning car.

Thus, the first and main control is the control of the positioning car 2, which is responsible for adjusting the cycle time of the rotary car dumper 1 with adjustments to the speed, acceleration, and deceleration of the positioning car 2.

The parameters of the positioning car 2 are adjusted according to three variables, namely: the level of bins 7; the last valid cycle time; and the ideal cycle time. If the level of bins 7 is above the ideal value and the time of the last valid cycle is less than the ideal cycle time, the cruising speed of the pushing car is reduced to cause the next cycles to be higher until the level of bins 7 is reduced and reaches an ideal value.

If the level of bins 7 is below the ideal value, the acceleration and deceleration parameters of the pushing car are adjusted to reduce the cycle time, thus increasing the level of bin 7 and reaching an ideal value.

If the level is in ideal level, the speed, acceleration, and deceleration parameters of the pushing car are configured to make the cycle time equal to the ideal cycle time, maintaining the level of bin 7 on the ideal limit.

The control of the positioning car 2 preferably comprises an encoder and an inverter and/or converter. The encoder and the inverter/converter are installed in the positioning car 2 itself, the encoder being used to measure the position of the car and the inverter/converter to generate a feedback of the current, torque, and speed of the positioning car.

In an alternative embodiment, any equipment capable of acquiring and registering both the precise position of the positioning car 2 and a feedback of the current and torque of the positioning car can be used, an such equipment does not need to be specifically an encoder and an inverter/converter.

In order to control the positioning car in closed grid, it is necessary to distinguish the analysis and control of the parameters between acceleration and deceleration of the positioning car 2. This distinction between acceleration and deceleration is necessary because, depending on the situation of the rails or railroad cars (e.g. railroad cars stopped), the behavior of the current and torque variables in acceleration are quite different from the deceleration process, see FIGS. 5A, 5B, 5C, and 5D.

Figure 4:
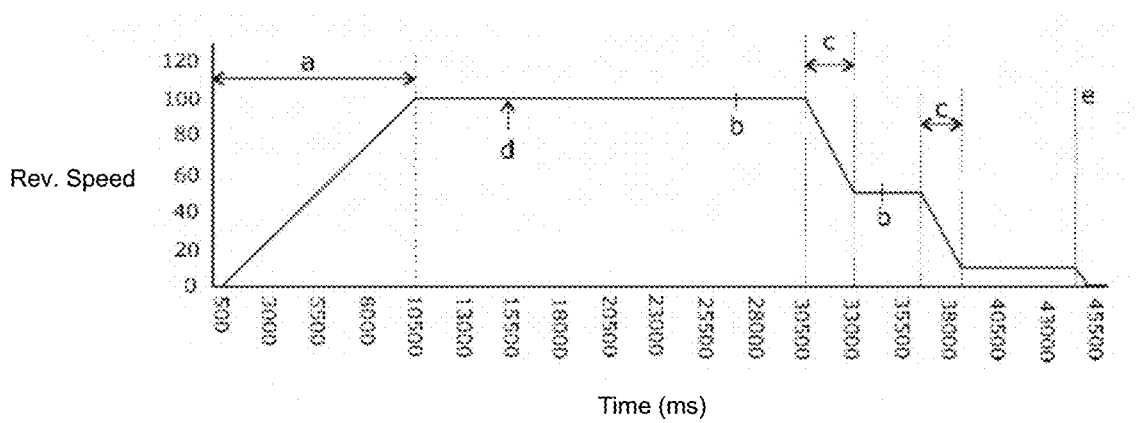
FIG. 4 depicts a graph of reference speed behavior of the pushing car during the positioning of the railroad cars within the turning drum of the rotary car dumper.

The main variables controlled and manipulated in the positioning car 2 are: acceleration ramp (a); cruising speed (d); deceleration points (b); and deceleration ramp (c), see FIG. 4. The other variables, such as speed after deceleration ramp and final position (e) of the positioning car 2, are usually fixed parameters of the system. FIG. 4 shows an example of reference speed behavior of the positioning car 2 during the positioning of the railroad cars within the turning drum 6 of the rotary car dumper.

The adjustments of the acceleration ramp variables (a), cruise speed (d), and deceleration points (b) are performed according to the information on current and torque of the positioning car 2 during the positioning of the railroad cars, this information being collected by means of the converter/inverter and the encoder. FIGS. 5A, 5C and 5B, 5D show an example of how the current and torque of the positioning car 2 behave, respectively.

Figure 5A:
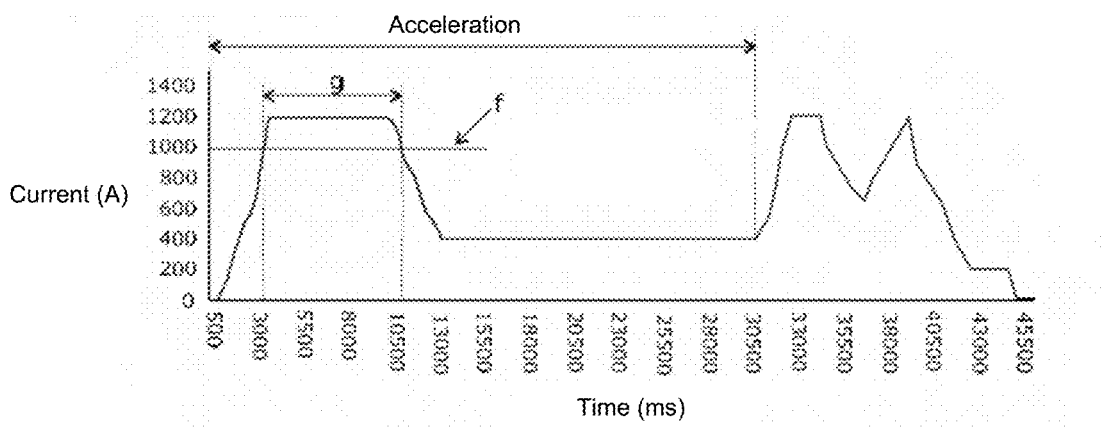
FIG. 5A depicts an example graph of how the positioning car current behaves during acceleration.
Figure 5B:
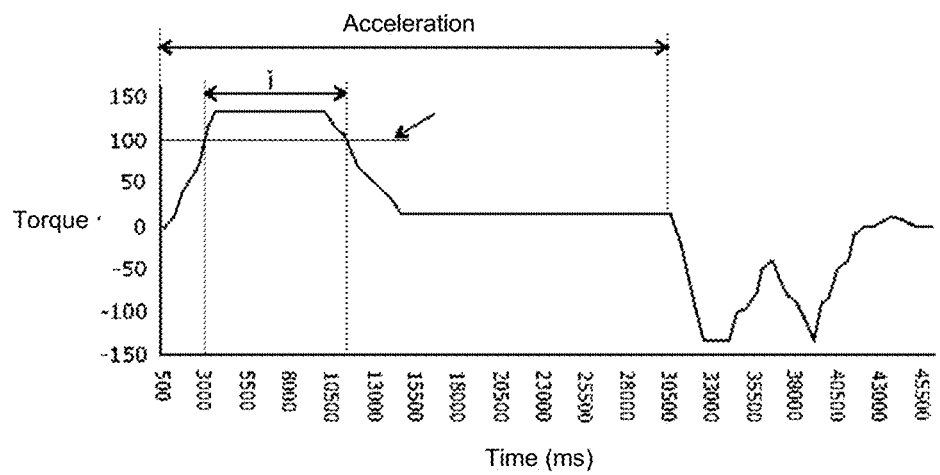
FIG. 5B depicts an example graph of how the positioning car torque behaves during acceleration.
Figure 5C:
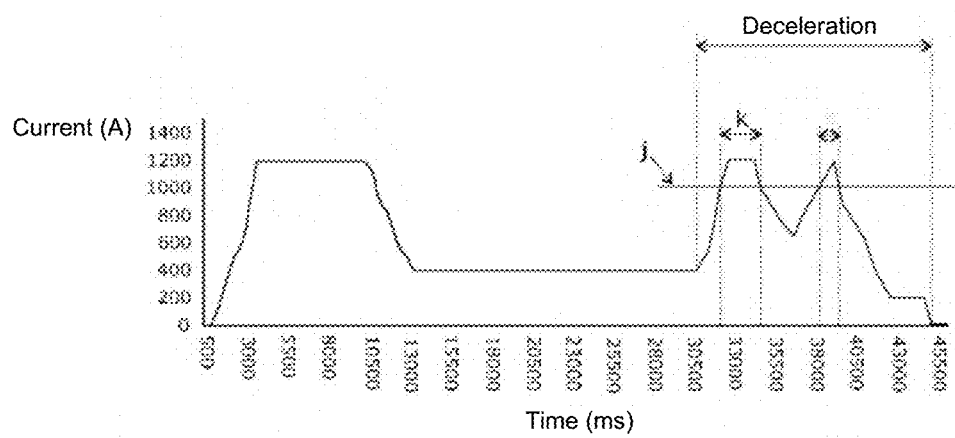
FIG. 5C depicts an example graph of how the positioning car current behaves during deceleration.

To better distinguish the analysis and control of the acceleration parameters from the analysis and control of the deceleration parameters of the positioning car 2, both controls are described separately, starting with the acceleration control, see FIGS. 5A and 5C.

In order to adjust the acceleration ramp (a), it is necessary to analyze the times at which the positioning car 2 remains with current and torque above adjustable parameters of current and high torque during the acceleration movement.

The procedure for adjusting the acceleration ramp (a) for positioning the railroad cars in the rotary drum 6 of the rotary car dumper is described below.

At first, it is necessary to parameterize the following variables that are used by the controller during the entire discharge of the railroad car batch, as follows: initial acceleration ramp; minimum acceleration ramp; maximum acceleration ramp; high torque time expected in acceleration; high current time expected in acceleration; high torque parameter in acceleration (h); and high current parameter in acceleration (f).

For the positioning of the first railroad car in the rotary drum 6, the acceleration ramp (a) must be equal to the initial acceleration ramp. During the positioning of each railroad car after the first railroad car, it must be measured the time at which the torque remains above the high torque parameter and the time at which the current remains above the high current parameter, see FIGS. 5A and 5C for better understanding.

If the high torque time obtained (i) or the high current time (g) obtained is greater than the expected current and high torque times, the value of the acceleration ramp (a) must be increased to decrease the forces of the positioning car 2 to prevent it from being above the expected torque and current for an excessive period of time.

If the high torque time obtained (i) and the high current time obtained (g) are less than the expected current and high torque times, the value of the acceleration ramp (a) must be decreased, increasing the forces of the positioning car 2 to decrease the cycle time.

However, depending on the information available on the rotary car dumper, relative to the positioning car 2, some additional information can be used as protection before reducing the acceleration ramp (a), such as if the maximum current obtained in the acceleration is greater than a maximum current expected during the monitored cycle, the acceleration ramp (a) cannot and, therefore, is not reduced.

In another example, if the tensioning of the wire rope tensioner is greater than a value expected during acceleration of the monitored cycle, the acceleration ramp (a) is not reduced for safety and rope integrity purposes.

In order to limit the acceleration ramp (a) in the upper and lower limits, the following logic is performed: if the resulting acceleration ramp (a) is greater than the upper acceleration ramp, the value of the acceleration ramp (a) is limited to the value of the upper acceleration ramp. In the same way, if the resulting acceleration ramp (a) is less than the lower acceleration ramp, the value of the resulting acceleration ramp (a) is limited to the value of the lower acceleration ramp.

Thus, the analysis and control of the parameters of acceleration of the positioning car 2 is configured to determine the value of the acceleration ramp (a) of the next cycle based on the three cases presented above, that is, increase, decrease, and limitation of the value of the acceleration ramp (a).

Having described the analysis and control of the parameters of acceleration of the positioning car 2, the analysis and control of the parameters of deceleration of the positioning car 2 is described below.

In order to make the adjustments to the deceleration ramp (c) and deceleration points (b) during the deceleration process, the following data must be analyzed: the times in which the current and torque of the positioning car 2 remain above the adjustable parameters of high current and low torque, respectively; and the time in which the torque returns to positive after the deceleration starts, so that when it is positive again the positioning car 2 has been able to brake the railroad cars batch and pull again at low speed to the final position.

Figure 5D:
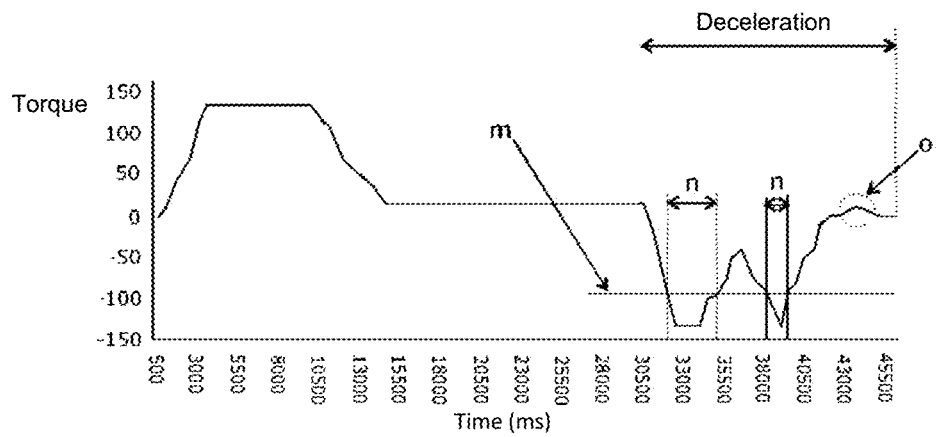
FIG. 5D depicts an example graph of how the positioning car torque behaves during deceleration.

The procedures for adjusting the ramp (c) and deceleration points (b) for positioning the railroad cars in the rotary drum 6 of the rotary car dumper are described below, see FIGS. 5B and 5D. At first, it is necessary to parameterize the following variables that are used by the controller during the entire discharge of the railroad car batch, as follows: initial deceleration ramp; maximum deceleration ramp; minimum deceleration ramp; initial deceleration points; minimum deceleration points; maximum deceleration points; low torque time expected in deceleration; high current time expected in deceleration; low torque parameter in deceleration (m); high current parameter in deceleration (j); positive torque time expected in deceleration; and very high torque time in deceleration.

For the positioning of the first railroad car, the deceleration ramp (c) and the deceleration point (b) must be equal to the initial deceleration ramp and the initial deceleration point, respectively. If the deceleration is performed in stages, the ramps (c) and the deceleration points (b) must be parameterized individually following the same logic, that is, using the initial values.

During the deceleration process for positioning each railroad car, the positioning car 2 applies a torque to break the railroad cars (negative torque). Thus, it must be measured the time in which the torque remains below n) the low torque parameter (m) and the time in which the current remains above (k) the high current parameter (l), thus allowing analyzing and performing possible changes in the points (b) and deceleration ramp (c), see FIGS. 5B and 5D.

If the low torque time obtained (n) or the high current time obtained (k) are greater than the expected times, the values of the acceleration points (b) must be reduced, so that the forces in the positioning car 2 are reduced to prevent overload of this equipment.

If the low torque time obtained (n) and the high current time obtained (k) are less than the expected times and the positive torque time obtained (o) is greater than the expected positive torque time, the values of the deceleration points (b) must be increased, so that the forces in the positioning car 2 are increased without overloading the equipment.

It is worth mentioning that, depending on the information available on the rotary car dumper, relating to the positioning car 2, some additional information can be used as protection before increasing the deceleration points (b), such as if the maximum current obtained in the deceleration is greater than a maximum current expected during the monitored cycle, the deceleration point (b) will not be increased to avoid damage to the positioning car 2.

In another example, if the tensioning on the steel cable turnbuckle is greater than an expected value during the deceleration of the monitored cycle, the deceleration point (b) should not and is not increased, preventing a cable break.

In another example, if the final position (e) of the pusher is greater than an expected value after the deceleration of the monitored cycle, the deceleration point (b) is not increased to prevent improper positioning of the positioning car.

If the obtained positive torque time (o) is less than the expected positive torque time, and the obtained low torque time (n) and the obtained high current time (k) are less than the expected times, the deceleration ramp (c) must be reduced, thereby increasing the stresses in the positioning car 2 and decreasing the deceleration time.

If the obtained positive torque time (o) is greater than the very high positive torque time and the deceleration point (b) is equal to the upper deceleration point or the obtained low torque (n) or the obtained hugh current time (k) are greater than the expected times, the deceleration ramp (c) must be increased, thereby reducing the stresses of the positioning car 2 during deceleration and increasing the time thereof.

If the resulting deceleration ramp (c) is greater than the upper deceleration ramp, the deceleration ramp (c) is limited to the upper deceleration ramp, as well as, if the resulting deceleration ramp (c) is smaller than the lower deceleration ramp, the deceleration ramp (c) is limited to the lower deceleration ramp, thereby limiting the deceleration ramp (c) according to the upper and lower limits to prevent damage to the equipment.

If the resulting deceleration point (c) is greater than the upper deceleration point, the deceleration point (c) is limited to the upper deceleration point, as well as, if the resulting deceleration point (c) is smaller than the lower deceleration point, the deceleration point (c) is limited to the lower deceleration ramp, thereby limiting the deceleration point (c) according to the upper and lower limits.

In this way, the analysis and control of the deceleration of the positioning car 2 makes the necessary changes in the deceleration ramp (c) and in the deceleration points (b) according to the cases presented above, thus making it possible to increase, decrease and limit them according to need.

Thus, both the analysis and acceleration control adjustments in respect to the analysis and deceleration control adjustments of the of the positioning car 2 are performed to change the cycle time of the rotary car dumper 1 as the control system determines and to ensure that the positioning car 2 is stopped in the correct position, that is, by positioning the cars within the rotary drum 6, without the need for excessive stress on the equipment.

Silos Level Control

The second control is the silos level control 7, which is configured to monitor and inform the amount of material contained within these elements. This control preferably comprises a radar which is installed in order to read the inside of the silo 7 of the rotary car dumper 1, which is configured to carry out the measurement of the level of the silo 7, and thus issue this information to be used as input in the control system.

In an alternative configuration, any type of level gauge can be used for silos 7, which only requires that the equipment will be weather resistant and perform this measurement accurately.

It should be noted that changes in the levels of silos 7 are due to their feed and ore output. Feeding of the silo 7 is made by means of the rotary of rotary car dumpers 1, which pours material into the silos 7 according to the cycles of the rotary car dumpers 1; and the output of the silo 7 is made by means of the feeders 8 which move the material to the belt carriers.

In this way, both the output of the silos 7 and the feed can be adjusted, the feed being adjusted according to the cycle time of the rotary car dumpers 1 and the output being adjusted according to the flow of the feeders 8.

Feeders Output Flow Control

The third and last control is the output flow of the feeders 8, which control is configured to perform a monitoring and changes in the volume of material that is coming out the feeder 8 and thereby control the productivity of the rotary car dumpers 1.

This control is configured to maintain the flow of material at the par value of the equipment, that is, to maintain the maximum material flow possible by the feeders 8 so that the productivity of the rotary car dumpers 1 is also maintained at the maximum.

The flow control of the feeders 8 comprises an estimator or flow meter installed in the output of the feeders 8 itself, it being possible to measure the mass of material being passed by that equipment in a given period of time.

Integration of Controllers

All such data collected by the radar, encoder and inverter/converter of the three controls mentioned above are issued to a control loop processor (CLP) of the control system. Thus, the rotary car dumpers control system is configured to integrate and communicate the data collected by the three closed mesh controls, modifying the cycle time to maintain maximum productivity of the equipment.

For integration and use of the control system, it is necessary to initially calculate the ideal cycle time according to the desired productivity value. The ideal cycle time is calculated by the ratio of the load contained in the cars C1 and C2 being discharged by the productivity set point (P), that is, the desired flow of material at the output of the feeders 8.

It should be noted that parcel C2 is only used in rotary car dumpers 1 which carry out the discharge of two cars simultaneously, the number of parcels C being equivalent to the number of cars being discharged simultaneously.

Knowing the value of the desired cycle time, the possible alternatives to control this cycle time to maximize machine productivity are analyzed by CLP of control system.

As previously stated, in order to increase or reduce the cycle time of the rotary car dumper 1, it is necessary to increase or reduce the speed/acceleration and deceleration time of the positioning car 2, this control being carried out by the control of the positioning car 2, as explained above.

The purpose of the rotary car dumper 1 control system is to keep the level of the silo 7 always full, with the least possible effort being made in the positioning car 2, so that high productivity can be achieved without compromising mechanical and electric integrity of positioner car 2.

Figure 6:
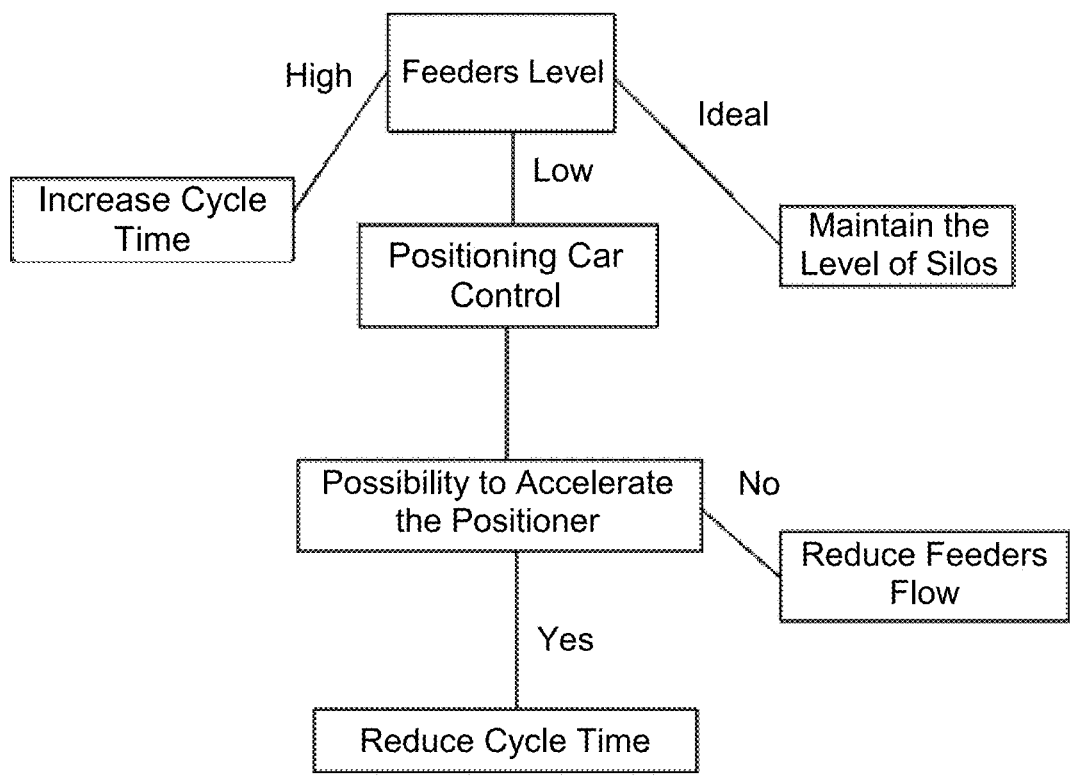
FIG. 6 is a flowchart that discloses the integration of the controls of the control system and the operation of the control method of the rotary car dumper.

The flowchart shown in FIG. 6 shows how the controllers are integrated. When the level of rile 7 is full, the cycle time should always maintain the silo 7 full, when it is with low level, it should reduce the cycle time, as much as possible, taking into account the efforts measured (current and speed) of the positioning car 2.

This invention also consists of a method of control rotary car dumper 1 provided with 4 steps described in detail below. The first stage (i) consists of verifying the level of the silos 7 by means of level control of the silos 7, verifying if it is low, ideal or high.

Based on the information collected in step i, step ii is then determined to be performed by means of the CLP of the rotary car dumper 1 control system, the possibilities being shown as follows.

If the level of the silos 7 is at the ideal level, the control system determines that the other controls, that is, the output flow control of the feeders 8 and the control of the positioning car 2 are kept at ideal levels, causing the material input is equal to the material output.

If the level of the silos 7 is high, the CLP of the control system determines that the control of the positioning car 2 increases the cycle time so that less material is dumped inside the silos 7. Thus, as the flow of output of the feeders 8 is already maintained at the maximum, the material output of the silos 7 is also maintained at the maximum as the inflow of material into the silos 7 is decreased with increase of cycle time.

If the level of the silos 7 is low, the CLP of the control system checks the control of the positioning car 2, checking for the possibility of decreasing the cycle time by increasing the stress on the positioning car 2, then initiating the third stage of the method of control of rotary car dumpers 1.

The third step (iii) consists in verifying the possibility of decreasing the cycle time by controlling the positioning car 2, being performed only when the level of the silo 7 is low. Such step takes into account the stresses employed in the positioning car 2 for this cycle time, verifying whether it is possible to increase these efforts to decrease the cycle time and, therefore, increase the amount of material dumped inside the silos 7 to, consequently, raise their level.

The fourth step (iv) depends on the third step (iii), being triggered only when the level of the silos 7 is low. If the CLP of the control system, based on the control of the positioning car 2 determines that it is possible to increase the stresses in the positioning car 2, the cycle time is then decreased to raise the level of the silo 7.

If the CLP of the control system, also based on the control of the positioning car 2, determines that it is not possible to increase the forces on the positioning car 2, then the output flow control of the feeders 8 is triggered to decrease the speed of this equipment, reducing the productivity of the equipment and, consequently, its efficiency.

Thus, having described the control system for rotary car dumpers 1 and their method of operation, it is possible to note that the major difference of the cycle control system of rotary car dumpers 1 in relation to the state of the art, is that the ideal cycle time is always calculated as a function of the information obtained by the process, thus an additional effort of the positioning car 2 is only required when it is really necessary.

With the implementation of the control, it is also possible to calculate the shortest cycle time as possible. for each positioning cycle of cars as a function of the information of the control efforts of the positioning car 2, so that it can be applied whenever necessary.

In addition, the control system reduces the stresses in the positioning car 2 during the discharge of the composition, since the rotary car dumper control system 1 comprises a level control of silo 7 integrated with the other closed mesh controls. In this way, the controller reduces cycle time only when it is really needed.

This description is intended to facilitate the understanding and illustrate some modalities of this invention and should not be construed as limiting the possible variations that may be implemented in the invention, which shall have its scope of protection duly defined in the claims.

The invention claimed is:

1. A method of operating a rotary car dumper, comprising:
   a) determining a silo level of at least one silo of at least one feeder by a silo level control to be at a first level or a second level; and
   b) adjusting the silo level, when the silo level is determined to be at:
      a first level, by increasing a cycle time of a discharge of material by a positioning car control;
      a second level, by:
         measuring a current, torque, position, speed, and acceleration of a positioning car by a positioning car control and verifying whether the cycle time can be decreased by increasing forces of the positioning car;
         decreasing the cycle time based on the positioning car control determining that the cycle time can be reduced; and
         decreasing an output flow of the material from the at least one feeder by a feeder flow control based on the positioning car control determining that the cycle time cannot be reduced;
      wherein the second level is determined by measuring the silo level that is less than the first level and less than a minimal level, wherein the minimal level is less than the first level and greater than the second level; and
   c) repeating a) and b) to maintain the silo level at the minimal level, calculated by flow set point.

2. The method according to claim 1, further comprising repeating the measuring and the decreasing until the silo level is maintained at the minimal level.

3. The method according to claim 1, wherein at least the increasing the cycle time of the discharge of the material and the maintaining the silo level with the cycle time at the minimal level is performed based on measuring acceleration and deceleration parameters, and controlling variables of the positioning car including acceleration ramp, cruising speed, deceleration points, and deceleration ramp.

4. The method according to claim 3, wherein the acceleration ramp is determined by parameterizing initial acceleration ramp, minimum acceleration ramp, high torque time expected in acceleration, high current time expected in acceleration, high torque parameter in acceleration, and high current parameter in acceleration.

5. The method according to claim 4, further comprising increasing a value of acceleration ramp based on the high torque time obtained or the high current time obtained being greater than expected high torque time or expected high current, respectively.

6. The method according to claim 5, wherein the acceleration parameters being measured and adjusted determine the value of the acceleration ramp of a next cycle based on an addition, reduction or limitation of the value of the acceleration ramp of a current cycle.

7. The method according to claim 6, further comprising reducing a value of the deceleration ramp based on a positive torque time obtained being smaller than expected positive torque time and the obtained low torque time and obtained high current time being smaller than expected low torque and expected high current times, so as to increase efforts in the positioning car and decrease the deceleration time.

8. The method according to claim 6, further comprising increasing a value of the deceleration ramp based on a positive torque time obtained being greater than the very high positive torque time and a deceleration point being equal to the upper deceleration point or an obtained low torque time and an obtained high current time being greater than the expected low torque time and the expected high current time, so as to reduce efforts in the positioning car and increase deceleration time.

9. The method according to claim 6, further comprising limiting a value of the deceleration ramp, so that the resulting value of the deceleration ramp is greater than an upper deceleration ramp, the resulting value of the deceleration ramp being maintained at or above the value of the upper deceleration ramp, and, if the resulting value of the deceleration ramp is smaller than the value of a lower deceleration ramp, the resulting value of the deceleration ramp is maintained at or below the value of the lower deceleration ramp.

10. The method according to claim 6, further comprising limiting a value of a deceleration point so that a resulting value of the deceleration point is greater than an upper deceleration point, the value of the deceleration point being maintained at or above the value of the upper deceleration point, and, if the resulting value of the deceleration point is smaller than the value of a lower deceleration point, the resulting value of the deceleration point being maintained at or below the value of the lower deceleration point.

11. The method according to claim 4, further comprising reducing a value of acceleration ramp based on the high torque time obtained and the high current time obtained being smaller than expected torque time and expected high current, respectively.

12. The method according to claim 11, further comprising using additional information available at the rotary car dumper as protection before reducing the acceleration ramp, the additional information including: if a maximum current obtained at an acceleration is greater than a maximum expected current during a monitored cycle, the value of the acceleration ramp is not reduced; and if a tensioning of a steel cable turnbuckle is greater than an expected value during the acceleration of the monitored cycle, the value of the acceleration ramp is not reduced.

13. The method according to claim 4, further comprising limiting a value of the acceleration ramp so that a resulting value of the acceleration ramp is greater than an upper value of the acceleration ramp, wherein the resulting value of the acceleration ramp is maintained at or above the upper value of the acceleration ramp.

14. The method according to claim 4, limiting a value of the acceleration ramp so that a resulting value of the acceleration ramp is smaller than a lower value of the acceleration ramp, wherein the resulting value of the acceleration ramp is maintained at or below the lower value of the acceleration ramp.

15. The method according to claim 3, further comprising adjusting the deceleration ramp and deceleration points according to parameterization of one or more variables including: initial deceleration ramp, maximum deceleration ramp, minimum deceleration ramp, initial deceleration points, minimum deceleration points, maximum deceleration points, expected low torque time in deceleration, high current time expected in deceleration, low torque parameter in deceleration, high current parameter in deceleration, expected positive torque time in deceleration, or very high torque time in deceleration.

16. The method according to claim 15, further comprising reducing values of deceleration points based on a low torque time obtained and a high current time obtained being greater than the expected low torque time and the expected high current.

17. The method according to claim 15, further comprising increasing values of deceleration points based on the low torque time obtained and the high current time obtained being smaller than the expected low torque time and the expected high current and the positive torque time obtained being greater than the expected positive torque time, so as to increase efforts in the positioning car.

18. The method according to claim 17, wherein the increasing the values of deceleration points, further include increasing according to additional information available at the rotary car dumper, the additional information including: if the maximum current obtained at the deceleration is greater than a maximum expected current during the monitored cycle, the values of deceleration points are not increased, if the tensioning of a steel cable turnbuckle is greater than an expected value during the deceleration of the monitored cycle, the values of the deceleration points are not increased, or if the final position of the positioning car is greater that an expected value after deceleration of monitored cycle, the values of deceleration points are not increased.

19. The method according to claim 15, wherein the deceleration parameters measured and adjusted to determine the value of the deceleration ramp and the deceleration points of a next cycle, is based on the addition, reduction or limitation of the values of the deceleration ramp and deceleration points of a current cycle.

* * * * *